(12) United States Patent
Ichikawa et al.

(10) Patent No.: US 8,872,936 B2
(45) Date of Patent: Oct. 28, 2014

(54) IMAGE PROCESSING DEVICE, WHITE BALANCE CORRECTION METHOD, AND IMAGING DEVICE

(75) Inventors: Manabu Ichikawa, Hachioji (JP); Shinya Takasumi, Akiruno (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/241,527

(22) Filed: Sep. 23, 2011

(65) Prior Publication Data

US 2012/0086830 A1 Apr. 12, 2012

(30) Foreign Application Priority Data

Oct. 8, 2010 (JP) ................. P2010-228529

(51) Int. Cl.
*H04N 9/73* (2006.01)
*H04N 5/235* (2006.01)

(52) U.S. Cl.
CPC ............. *H04N 9/735* (2013.01); *H04N 5/2355* (2013.01)
USPC ...................................................... 348/223.1

(58) Field of Classification Search
USPC ......................................... 348/223, 222, 229
See application file for complete search history.

(56) References Cited

U.S. PATENT DOCUMENTS

| 7,808,545 | B2 * | 10/2010 | Nakayama ................. 348/362 |
| 7,940,311 | B2 * | 5/2011 | Trimeche et al. .......... 348/227.1 |
| 8,400,527 | B2 | 3/2013 | Furuya |
| 2003/0219156 | A1 * | 11/2003 | Muraki ....................... 382/167 |
| 2004/0051790 | A1 * | 3/2004 | Tamaru et al. ............. 348/223.1 |
| 2009/0002518 | A1 * | 1/2009 | Nakamura ................. 348/223.1 |
| 2010/0128142 | A1 | 5/2010 | Ichikawa |
| 2010/0201840 | A1 * | 8/2010 | Ajito ........................ 348/223.1 |
| 2012/0086830 | A1 * | 4/2012 | Ichikawa et al. ............ 348/223.1 |

OTHER PUBLICATIONS

Office Action from corresponding Japanese Patent Application No. 2010-228529, mailed Jun. 24, 2014 (3 pgs.).

* cited by examiner

*Primary Examiner* — James Hannett
*Assistant Examiner* — Padma Haliyur
(74) *Attorney, Agent, or Firm* — John C. Pokotylo; Straub & Pokotylo (57) ABSTRACT

An image processing device of the present invention comprises: an image combining section for combining a plurality of combination image data and generating combined image data; a WB setting section for performing setting for white balance correction processing; an image WB gain calculation section for calculating image WB gain respectively for the plurality of combination image data in accordance with setting of the WB setting section; a combined image WB gain calculating section for calculating combined image WB gain for the combined image data in accordance with information relating to a combination ratio for the image combining section and image WB gain for the respective plurality of combination image data; and a WB correction section for carrying out white balance correction for image data according to the combined image WB gain.

20 Claims, 8 Drawing Sheets

IMAGE PROCESSING DEVICE, WHITE BALANCE CORRECTION METHOD, AND IMAGING DEVICE

Benefit is claimed, under 35 U.S.C. §119, to the filing date of prior Japanese Patent Application No. 2010-228529 filed on Oct. 8, 2010. This application is expressly incorporated herein by reference. The scope of the present invention is not limited to any requirements of the specific embodiments described in the application.

BACKGROUND OF THE INVENTION

1. Field of the Invention

The present invention relates to an image processing device for combining a plurality of images such as taken images, an image processing method, and an imaging device.

2. Description of the Related Art

An image processing device, such as a digital camera, is sometimes installed with an image combining (multiple exposure) function for combining a plurality of JPEG images or RAW images by addition after adjusting brightness by multiplying the plurality of images by a coefficient, and generating an image so as to depict a plurality of scenes with a single image.

For example, Japanese patent No, 3800192 (published Jul. 26, 2006) discloses an imaging combining device where, in the case of combination using an image that has been subjected to image processing, such as a JPEG image, by carrying out combination by converting to an image before image processing, and carrying out image processing again, the effects of gamma conversion etc. are eliminated. Also, Japanese patent laid-open No. 2010-124411 (laid-open Jun. 3, 2010) discloses an image processing device that is capable of image combining with WB corrected, even in the case where taken RAW images have different light sources, by combining image data that has been subjected to predetermined white balance (hereafter referred to as "WB") correction with respect to RAW images.

With an imaging device such as a digital camera, a light source is automatically estimated at the time of shooting and various WB modes are provided, such as auto white balance (AWB) mode for appropriately correcting WB, preset WB mode in which a user selects a mode in accordance with the light source, and one touch WB where WB is matched to a specific subject, with WB correction being carried out in accordance with the WB mode that has been selected by the user.

By selecting WB mode appropriate to the light source at the time of shooting, or AWB mode, it is possible for the user to take a picture in which WB of an achromatic (white or gray) subject has been ascertained. Also, by intentionally selecting different WB modes, it is possible to impart color to an achromatic subject. In this way, it is possible to change the color cast of a photograph by progressively setting the WB mode.

SUMMARY OF THE INVENTION

An object of the present invention is to provide an image processing device that can carry out appropriate WB correction in accordance with a WB mode when carrying out image combining, an image processing method, and an imaging device.

An image processing device of the present invention comprises: an image combining section for combining a plurality of combination image data and generating combined image data; a WB setting section for performing setting for white balance correction processing; an image WE gain calculation section for calculating image WB gain respectively for the plurality of combination image data in accordance with setting of the WB setting section; a combined image WB gain calculating section for calculating combined image WB gain for the combined image data in accordance with information relating to a combination ratio for the image combining section and image WB gain for the respective plurality of combination image data; and a WB correction section for carrying out white balance correction for image data according to the combined image WB gain, wherein the WB correction section carries out white balance correction for the combined image data using combined image WB gain that has been calculated by the combined image WB gain calculating section, in accordance with setting of the WB setting section.

A white balance correction method for a combined image formed by combining a plurality of image data output from an imaging section or output from a storage section, comprises: generating combined image data by combining a plurality of image data acquired by imaging of the imaging section, or stored in the storage section, calculating image WE gain for the respective plurality of image data in accordance with setting for white balance correction processing, calculating combined image WB gain corresponding to the combined image data in accordance with information relating to combination ratio for the plurality of image data and image WB gain respectively corresponding to the plurality of image data, and carrying out white balance correction for the combined image data according to the combined image WB gain.

An imaging device of the present invention comprises: an imaging section for generating image data by forming a subject image; an image creation and storage section for creating image data by subjecting image data output from the imaging section to image processing and storing the image data; an image combining section for generating combined image data by combining a plurality of combination image data; a WB setting section for performing setting for white balance correction processing; an image WB gain calculation section for calculating image WB gain respectively for the plurality of combination image data in accordance with setting of the WB setting section; a combined image WB gain calculating section for calculating combined image WB gain for the combined image data in accordance with information relating to a combination ratio for the image combining section and image WB gain for the respective plurality of combination image data; and a WB correction section for carrying out white balance correction for image data according to the combined image WB gain, wherein the WB correction section carries out white balance correction for the combined image data using combined image WB gain that has been calculated by the combined image WB gain calculating section, in accordance with setting of the WB setting section.

DETAILED DESCRIPTION OF THE PREFERRED EMBODIMENTS

Preferred embodiments using a camera to which the present invention has been applied will be described in the following in accordance with the drawings. A camera of a preferred embodiment of the present invention is a digital camera, and has an imaging section, with a subject image being converted to image data by this imaging section, and the subject image then being subjected to live view display on a display section arranged on a rear surface of a main body based on this converted image data. A photographer determines composition and photo opportunity by looking at the live view display. At the time of a release operation image data is stored in a storage medium. Also, image data that has been stored in the storage medium can be played back and displayed on the display section if playback mode is selected.

Figure 1:
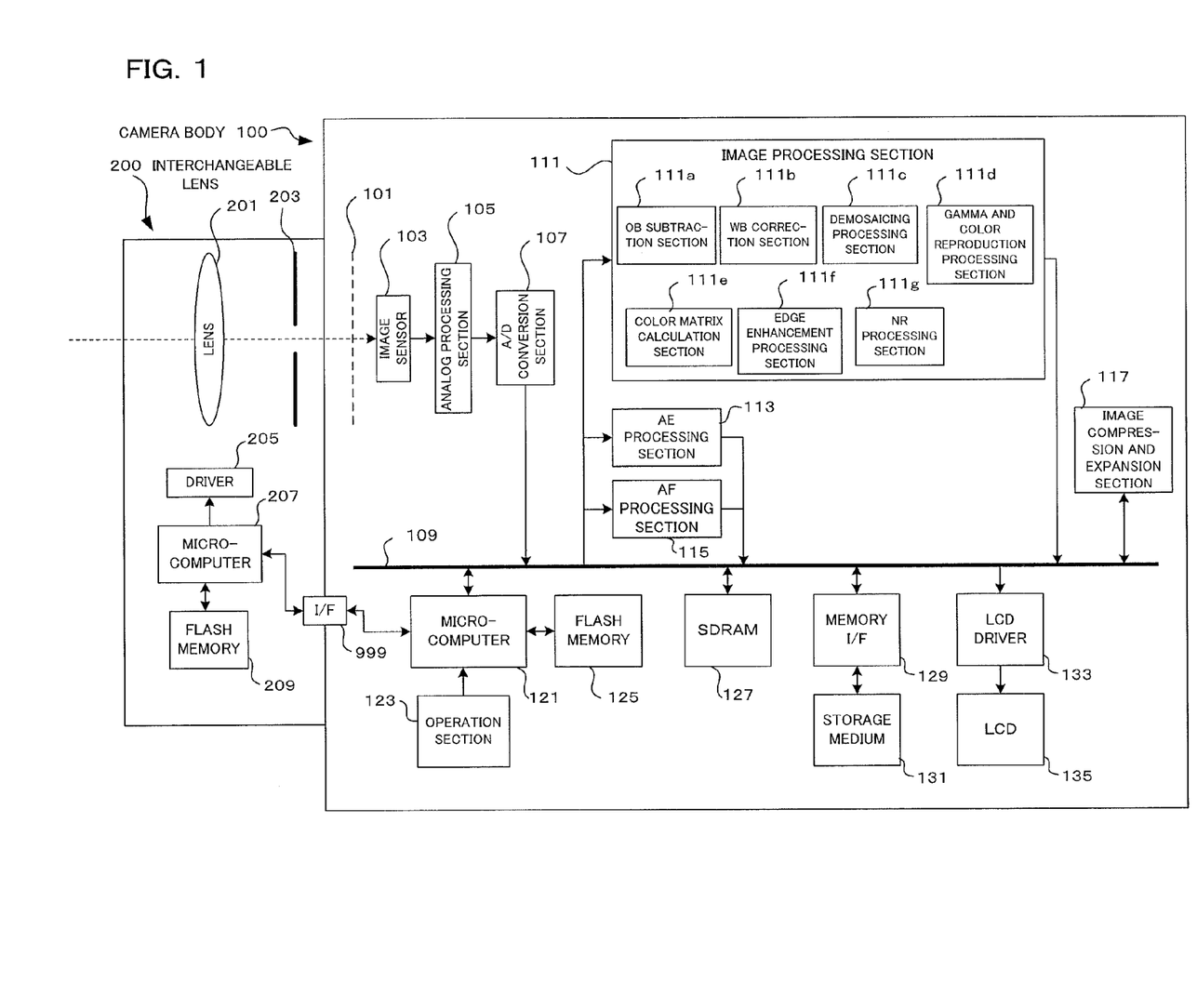
FIG. 1 is a block diagram mainly showing the electrical structure of a digital camera of a first embodiment of the present invention.

FIG. 1 is a block diagram mainly showing the electrical structure of a camera of a first embodiment of the present invention. This camera comprises a camera body 100 and an interchangeable lens 200 that can be attached to and removed from the camera body.

The interchangeable lens 200 is made up of a photographing lens 201, a diaphragm 203, a driver 205, a microcomputer 207 and a flash memory 209, and has an interface (hereafter referred to as I/F) 999 between the interchangeable lens 200 and the camera body 100.

The photographing lens 201 is an optical lens for forming the subject image, and is constituted by a fixed focal length lens or a zoom lens. The diaphragm 203 is arranged behind the optical axis of this photographing lens 201, and the diaphragm 203 has a variable aperture to control subject light flux passing through the photographing lens 201. Also, the photographing lens 201 is movable in the direction of the optical axis by the driver 205. Focus position of the photographing lens 201 is controlled based on control signals from the microcomputer 207, and in the case where the photographing lens 201 is a zoom lens focal length is also controlled. The driver 205 also controls aperture of the diaphragm 203.

The microcomputer 207 that is connected to the driver 205 is connected to the I/F 999 and the flash memory 209. The microcomputer 207 operates in accordance with a program stored in the flash memory 209, to perform communication with a microcomputer 121 within the camera body 100, which will be described later, and performs control of the interchangeable lens 200 based on control signals from the microcomputer 121.

Besides the previously described program, various data such as optical characteristics of the interchangeable lens 200 and adjustment values are stored in the flash memory 209.

The I/F 999 is an interface for carrying out communication between the microcomputer 207 inside the interchangeable lens 200 and the microcomputer 121 inside the camera body 100.

Inside the camera body 100, a mechanical shutter 101 is arranged on the optical axis of the photographing lens 201. This mechanical shutter 101 is constituted by a well-known lens shutter or focal plane shutter, and controls transit time of subject light flux. Behind this mechanical shutter 101, an image sensor 103 is arranged at a position where the subject image is formed by the photographing lens 201.

The image sensor 103 has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode. A Bayer array color filter is arranged on the front surface of each pixel. A Bayer array has lines of R pixels and G (Gr) pixels arranged alternately in a horizontal direction, and lines of G (Gb) pixels and B pixels arranged alternately in a horizontal direction, and also has these 3 lines arranged alternately in a vertical direction.

The image sensor 103 is connected to an analog processing section 105, and the analog processing section 105 performs wave shaping on the photoelectric conversion signals (analog image signals) that have been read out from the image sensor 103 after reducing reset noise etc., and also carries out gain increase so as to achieve an appropriate signal level. The analog processing section 105 is connected to an A/D conversion section 107, and this A/D conversion section 107 performs analog to digital conversion on the analog image signals, and outputs the digital image signals (hereafter referred to as image data) to a bus 109.

The bus 109 is a transfer path for transferring various data, that has been read out or generated inside the camera body 100, within the camera body 100. Besides the previously described A/D conversion section 107, an image processing section 111, AE processing section 113, AF processing section 115, image compression and expansion section 117, the microcomputer 121, an SDRAM (synchronous dynamic random access memory) 127, memory interface (hereafter referred to as memory I/F) 129, and liquid crystal (hereafter referred to as LCD) driver 133 are connected to the bus 109.

The image processing section 111 that is connected to the bus 109 includes an optical black subtraction section (hereafter referred to as an OB subtraction section) 111a, white balance correction section (hereafter referred to as WB correction section) 111b, demosaicing processing section 111c, gamma and color reproduction processing section 111d, color matrix calculating section 111e, edge enhancement processing section 111f, and noise reduction processing section (hereafter referred to as NR processing section) 111g, and reads out image data that has been temporarily stored in the SDRAM 127 and performs various image processing on this image data. The image processing section 111 also functions as an image combining section for combining a plurality of combination image data to create combined image data.

The OB subtraction section 111a performs optical black subtraction processing. With this optical black subtraction processing, and optical black value, which is ascribable to dark current etc. of the image sensor 103, is subtracted from a pixel value of each pixel constituting the image data.

The WB correction section 111b carries out white balance correction on image data. White balance correction is correction such that the color white is correctly reflected as white, under light sources of various color temperatures. Either a light source mode, such as clear sky, cloudy sky, shade, tungsten bulb or fluorescent light, is set by the user, or an auto white balance mode or underwater white balance mode for automatically calculating a white balance correction amount at the camera side, is selected, and white balance correction is carried out on the image data in accordance with this set mode. The underwater white balance mode is a mode for automatically detecting an underwater color cast that changes with various factors in the water such as water depth and weather, and automatically calculating white balance correction amount.

The demosaicing processing section 111c performs demosaicing processing to image data constituted by R, G B information per single pixel on the image data that has been acquired in the Bayer array. The gamma and color reproduction processing section 111d carries out gamma correction processing, and color reproduction processing to change the color cast of an image. The color matrix calculating section 111e corrects image data, by carrying out a linear transformation to multiply the image data by a color matrix. The edge enhancement processing section 111f carries out edge enhancement to extract edges from the image data and enhance the image data edges.

The NR processing section 111g carries out processing to reduce noise of the image data by using a filter to reduce a high-frequency component or by coring processing etc. The image processing section 111 selects each of the sections 111a-111g and performs respective processing, and temporarily stores image data that has been subjected to image processing in the SDRAM 127 by means of the bus 109.

The AE processing section 113 measures subject brightness, and outputs via the bus 109 to the microcomputer 121. A dedicated photometric sensor for subject brightness measurement may be provided, but in this embodiment subject brightness is calculated based on image data that is based on output of the image sensor 103.

The AF processing section 115 extracts signals for high frequency components from image data, acquires a focus evaluation value using integration processing, and sends the focus evaluation value via the bus 109 to the microcomputer 121. In this embodiment, focusing of the photographing lens 201 is carried out using the so-called contrast method. Besides the contrast method, AF processing may also be carried out using another automatic focus detection method, such as phase difference AF.

The image compression and expansion section 117 reads out data from the SDRAM 127 at the time of storing image data to a storage medium 131, compresses the read-out image data in accordance with various compression methods, such as the JPEG compression method, and temporarily stores this compressed image data in the SDRAM 127. The microcomputer 121 creates a JPEG file by adding a JPEG header, that is required to make a JPEG file, to JPEG image data that has been temporarily stored in the SDRAM 127, and stores this created JPEG file in the storage medium 131 by means of the memory I/F 129.

The image compression and expansion section 117 also carries out expansion of JPEG image data for image playback display. In the expansion, a JPEG file that is stored in the storage medium 131 is read out, and after being subjected to expansion processing in the image compression and expansion section 117 the expanded image data is temporarily stored in the SDRAM 127. With this embodiment, the JPEG compression system is adopted as the image compression system, but the compression system is not limited to this and another compression systems may be used, such as TIFF, MPEG, and H.264. The storage medium 131 is a storage medium such as a memory card that can be loaded into and taken out of the camera body 100, but this is not limiting and it may also be a hard disk or the like built into the camera body 100.

The microcomputer 121 provides a function as a control section for this entire camera, and performs overall control of various sequences of the camera. The microcomputer 121 functions as an image WB gain calculating section for calculating image WB gain for the respective plurality of combination image data according to setting of the WB setting section that carries out predetermined setting for white balance correction processing. The microcomputer 121 also functions as a combined image WB gain calculation section for calculating combined image WB gain for the combined image in accordance with information relating to a combination ratio of the image combining section (image processing section 111), and image WB gain for the respective plurality of combination image data calculated by the image WB gain calculating section. The composition coefficient, which will be described later, represents the "combination ratio". Besides the previously described I/F 999, an operating section 123 and a flash memory 125 are connected to the microcomputer 121.

The operating section 123 includes operation members such as various input buttons, like a power supply button, release button, a movie button, playback button, menu button, cross key button, and OK button, and various input keys, and detects operations states of these operation members and outputs the result of detection to the microcomputer 121. The microcomputer 121 executes various sequences according to user operation based on the result of detection of the operation members from the operating section 123. The power supply button is an operation member for instructing to turn a power supply of the digital camera on or off. If the power supply button is pressed, the power supply of the digital camera is turned on, and if the power supply button is pressed once again the power supply of the digital camera is turned off.

The release button is made up of a first release switch that turns on when the button is pressed down half way, and a second release switch that is turned on when the button is pressed down further from the half-pressed state to be pressed down fully. The microcomputer 121 executes shooting preparation sequences such as AE processing and AF processing if the first release switch is turned on. Also, if the second release switch is turned on shooting is carried out by executing a series of shooting sequences to control the mechanical shutter 101 etc., acquire image data based on a subject image from the image sensor 103 etc., and store this image data in the storage medium 131.

The movie button is a button for starting and stopping shooting of a movie. In an initial state, there is a movie not yet shot state, and if the movie button is pressed in this state shooting of the movie is commenced, and if the movie button is pressed during movie shooting, shooting of the movie is stopped. Accordingly, every time the movie button is pressed shooting of the movie repeatedly alternates between start and stop. The playback button is an operation button for setting and canceling playback mode settings, and if playback mode is set image data of a taken image is read out from the storage medium 131, and a taken image is playback displayed on the LCD 135.

The menu button is an operation button for causing display of menu screens on the LCD 135. It is possible to set various modes of the camera on the menu screen, and it is possible to carry out setting for white balance modes such as, for example, clear sky, cloudy, shade, tungsten bulb, fluorescent light etc. and for white balance modes such as auto white balance and underwater white balance. It is also possible to set image combining and RAW editing on the menu screen.

The flash memory 125 stores a program for executing the various sequences of the microcomputer 121. The microcomputer 121 carries out control of the digital camera based on this program. The flash memory 125 also stores various adjustment values such as a table showing combinations of exposure control values (ISO speed, aperture value, shutter speed) to achieve appropriate exposure for the subject brightness, white balance gain for carrying out white balance correction, and color matrix coefficient etc.

The SDRAM 127 is an electrically rewritable volatile memory for temporary storage of image data etc. This SDRAM 127 temporarily stores image data that has been output from the A/D conversion section 107, and image data that has been processed in the image processing section 111 and image compression and expansion section 117 etc.

The memory I/F 129 is connected to the storage medium 131, and carries out control for reading and writing of data such as image data and headers attached to image data to and from the storage medium 131. The storage medium 131 is a memory that can be loaded into and taken out of the camera body, and may be a memory built into the camera body, such as a hard disk.

The LCD driver 133 is connected to the LCD 135, and reads out from the SDRAM 127 and storage medium 131 to display an image on the LCD 135 based on image data that has been expanded by the image compression and expansion section 117. The LCD 135 includes a liquid crystal panel on the rear surface or the like of the camera body 100, and performs image display. As image display modes, there are Quickview Display for displaying stored image data for only a short time, playback display of image files for still images and movies that have been stored in the storage medium 131, and movie display such as live view display. In the case of displaying image data that has been compressed, display is carried out after applying expansion processing by the image compression and expansion section 117, as was described previously. The display section is not limited to an LCD, and other display panels such as organic EL may also be adopted.

Figure 2:
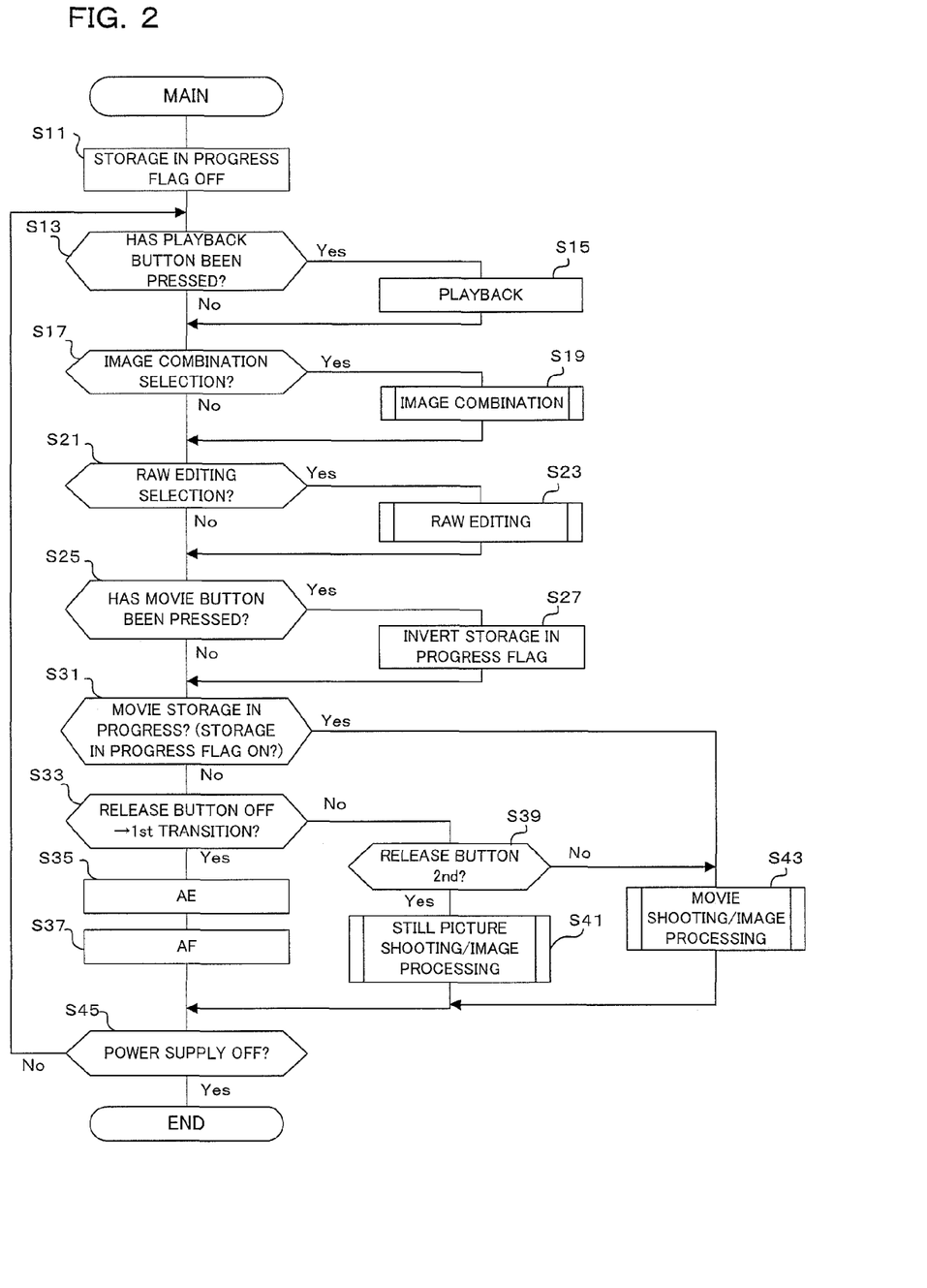
FIG. 2 is a flowchart showing a main operation of the digital camera of the first embodiment of the present invention.

Next, main processing of the camera of this embodiment will be described using the flowchart shown in FIG. 2. If the power supply button is operated and the power supply is turned on, operation of the main flow shown in FIG. 2 is started. If the operation is started, a storage in progress flag is first initialized to off (S11). This storage in progress flag is a flag representing whether or not a movie is being stored, and if the flag is on it means that storage of a movie is in progress, while when the flag is off it means that storage of a movie is not being carried out.

If the storage flag has been initialized to off, it is next determined whether or not the playback button has been pressed (S13). Here, determination is carried out by detecting the operating state of the playback button within the operating section 123. If the result of this determination is that the playback button has been pressed, playback mode is executed (S15). Here, image data is read out from the storage medium 131, and a table of still images and movies is displayed on the LCD 135. The user selects an image from within the table by operating the cross shaped button and confirms the image using the OK button. In the case where the confirmed image is a movie, it is subjected to sequential movie playback from a leading frame, in time series. In the case where the confirmed image is a still image, the confirmed image is displayed.

Once playback has been carried out a step S15, or if the result of determination in step S13 was that the playback button was not pressed, it is next determined whether or not image combination has been selected (S17). Image combination can be set on the menu screen when a plurality of RAW data are stored in the storage medium 131.

If the result of determination in step S17 is that image combination has been selected, image combination is carried out (S19). Image combination is combining a plurality of selected RAW data, to create an image that is like a multiple exposure photograph. Here, the RAW data is read out from the image sensor, and is image data before image processing that has not been demosaiced. Detailed operation of this image combination will be described later using FIG. 6.

Once image combination has been carried out in step S19, or if the result of determination in step S17 was that image combination was not selected, it is next determined whether or not RAW editing has been selected (S21). RAW editing can be set on the menu screen when RAW data is stored in the storage medium 131.

If the result of determination in step S21 is that RAW editing has been selected, RAW editing is carried out (S23). RAW editing is subjecting RAW data to image processing to create a JPEG file. Detailed operation of this RAW editing will be described later using FIG. 7.

Once RAW editing has been carried out in step S23, or if the result of determination in step S21 was that RAW editing was not selected, it is next determined whether or not the movie button has been pressed (S25). In this step the operating state of the movie button of the operating section 123 is detected, and determination is carried out based on the detection result.

If the result of determination in step S25 is that the movie button has been pressed, inversion of the storage in progress flag is next carried out (S27). As was described previously, since start and stop of movie shooting is repeatedly alternated every time the movie button is pressed, in this step the storage in progress flag is inverted to on if the storage in progress flag is off, and inverted to off if the storage in progress flag is on.

Once inversion of the storage in progress flag has been carried out in step S27, or if the result of determination in step S25 was that the movie button had not been pressed, it is next determined whether or not storage of a movie is in progress (S31). Since the storage in progress flag indicates a storage state of a movie, in this step it is determined whether or not the storage in progress flag on.

If the resulting determination in step S31 is that movie storage is not in progress, it is next determined whether or not the first release switch has been pressed, in other words whether or not the first release switch has changed from off to on (S33). For this determination, the state of the first release switch that is linked to the release button is detected by the operating section 123, and determination is carried out based on the results of detection. If the result of detection is that the first release switch has changed from off to on, the result of determination becomes yes, while on the other hand if an on state or an off state is maintained the result of determination becomes no.

If the result of determination in step S33 is that the first release has been pressed, then in the case where the first release has transitioned from off an AE operation is executed (S35). Here, the AE processing section 113 measures subject brightness based on image data acquired by the image sensor 103, and calculates shutter speed and aperture value etc. for correct exposure based on this subject brightness.

Once the AE operation has been carried out, an AF (autofocus) operation is executed (S37). Here, the driver 205 controls focus position of the photographing lens 201 by means of the microcomputer 207 inside the interchangeable lens 200 so that a focus evaluation value that has been acquired by the AF processing section 115 becomes a peak value. As a result, if the release button is pressed down halfway when movie storage is not in progress, focusing of the photographing lens 201 is carried out once at that point in time.

If the result of determination in step S33 is that the first release has not transitioned from off to on, it is determined whether or not the second release has been pressed, that is, whether or not the release button has been pressed down fully and the second release switch is on (S39). In this step, the state of the second release switch that is linked to the release button is detected by the operating section 123, and determination is carried out based on the result of detection.

If the result of determination in step S39 is that the second release has been pressed, still image shooting and image processing of the still image are carried out (S41). Here, after image processing and image compression processing have been carried out for image data of the still images based on image signals from the image sensor 103, the resultant image data is stored in the storage medium 131. Detailed operation of this still image shooting and image processing will be described later using FIG. 3.

If the result of determination in step S31 is that movie storage is in progress, or if the result of determination in step S39 is that the second release has not been pressed, movie shooting and image processing are carried out (S43). In this step, in the event that movie storage is in progress, after image processing and image compression processing have been carried out for image data of the movie based on image signals from the image sensor 103, the resultant image data is stored in the storage medium 131. Also, if movie storage is not in progress, live view display is carried out in order to determine subject composition and when to press the release button for still image shooting. Detailed operation of this movie shooting and image processing will be described later using FIG. 4.

If the AF operation has been executed in step S37, or if the still image shooting and image processing have been executed in step S41, or if the movie shooting and image processing have been executed in step S43, it is next determined whether or not the power supply is off (S45). In this step it is determined whether or not the power supply button of the operation section 123 has been pressed again. If the result of this determination is that the power supply is not off, processing returns to step S13. On the other hand is the result of determination is that the power supply is off, a termination operation of the main flow is executed and then the main flow is terminated.

Figure 3:
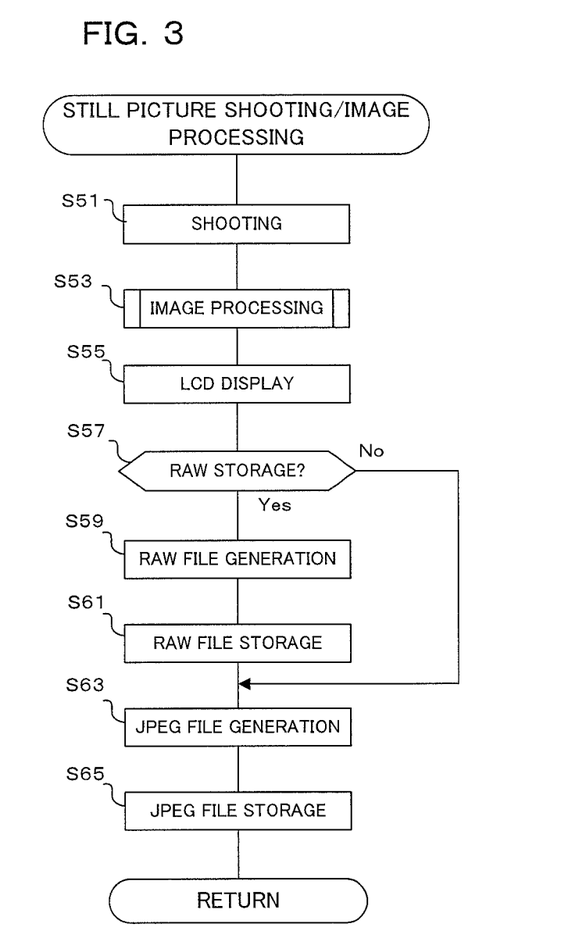
FIG. 3 is a flowchart showing a still image shooting and image processing operation of the digital camera of the first embodiment of the present invention.

Next the still image shooting and image processing of step S41 will be described using FIG. 3. If this still image shooting and image processing flow is entered, a shooting operation is carried out (S51). Here, control for the mechanical shutter 101 and diaphragm 203 etc. is carried out based on exposure control values calculated in step S35, and charge accumulation control for photoelectric current of the image sensor 103 is carried out. Once an exposure operation for the image sensor 103 is completed, image signals are read out.

If the shooting operation of step S51 is complete, image processing is carried out next (S53). In this step, various image processing such as optical black correction, white balance correction, demosaicing processing, color matrix calculation etc. is carried out by the image processing section 111 on image signals that have been read out from the image sensor 103, and Bayer data that was acquired in the Bayer array is converted to YCbCr data. It is also possible to convert to RGB data instead of to the YCbCr data. Detailed operation of this image processing will be described later using FIG. 5.

Once the image processing of step S53 is complete, LCD display is next carried out (S55). In this step a QuickView image is displayed on the LCD 135 based on image data that was acquired in step S51 and subjected to image processing in step S53.

Once LCD display has been carried out, it is next determined whether or not RAW storage will be carried out (S57). The image data storage method is set in advance on the menu screen, and so determination here is performed according to the set state. As a storage method for the image data there is JPEG only, or RAW and JPEG etc. If at least RAW has been selected RAW storage is determined. Accordingly, in the case where RAW and JPEG have been set, the determination of step S57 becomes yes. Besides the above described storage methods, a RAW only storage mode may also be set.

If the result of determination in step S57 is RAW storage, generation of a RAW file is next carried out (S59). Here, a RAW file is generated by attaching a thumbnail image obtained by reducing image processed YCbCr data, an OB value, WB gain corresponding to each WB mode, and other information such as image size etc., to the Bayer data (image signals) that has been read out from the image sensor 103, as a header. There is also no problem if the Bayer data is compressed.

If a RAW file has been generated, the RAW file is then stored (S61). Here, the RAW file generated in step S59 is stored in the storage medium 131 via the memory I/F 129.

If the RAW file is stored in step S61, or if the result of determination in step S57 was not RAW storage, JPEG file generation is next carried out (S63). In this step, image data for a YCbCr data format still image is subjected to JPEG compression by the image compression and expansion section 117. Information such as image size and shooting conditions are then created as header information, and this header information is attached to the JPEG compressed image data to generate a JPEG file.

Next, JPEG file storage is carried out (S65). In this step, a JPEG file that was generated in step S63 is stored in the storage medium 131 via the memory I/F 129. Once storage of the JPEG file is carried out, the original processing flow is returned to.

Figure 4:
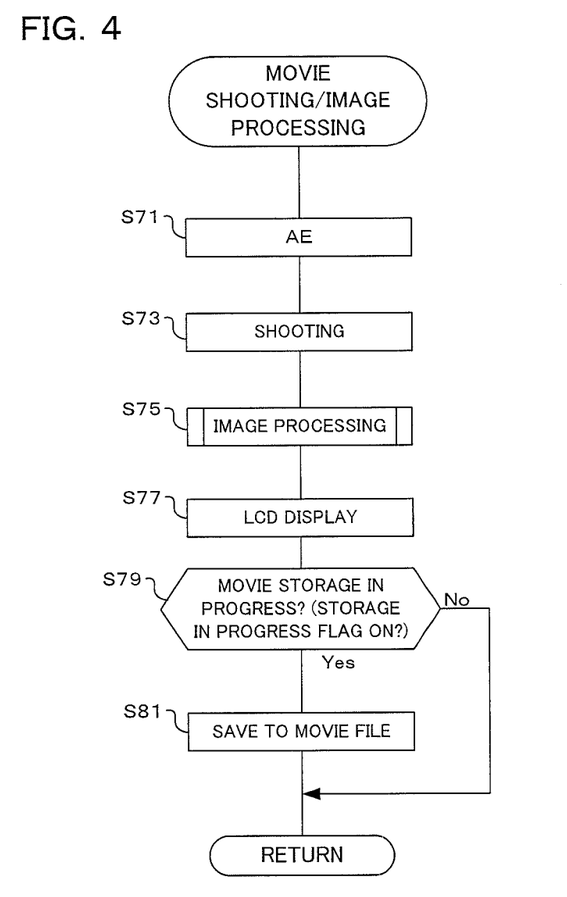
FIG. 4 is a flowchart showing a movie shooting and image processing operation of the digital camera of the first embodiment of the present invention.

Next the movie shooting and image processing of step S43 will be described using FIG. 4. If this movie shooting and image processing flow is entered, AE processing is first carried out (S71). In this step, subject brightness is measured by the AE processing section 113, and exposure control values to obtain correct exposure are determined based on this subject brightness. In determining the exposure control values, because of the AE processing for movie shooting, shutter speed of an electronic shutter is used for controlling exposure time with the mechanical shutter 101 kept open, and shutter speed, aperture value and ISO speed value to achieve correct exposure are determined. The shutter speed, aperture value and ISO speed are determined by referencing an exposure conditions determination table stored in advance in the flash memory 125, based on subject brightness.

Next, an exposure operation is carried out (S73). In this step, control of aperture value, electronic shutter, and ISO speed is carried out in accordance with exposure control values calculated in step S71, and charge accumulation of photoelectric current of the image sensor 103 is carried out. If exposure for one frame constituting the movie is complete, image signals are read out.

If shooting has been carried out, image processing is carried out (S75). This image processing is the same as that in step S53, in which Bayer data is subjected to image processing and converted to YCbCr data, but similar to the case of still images it is also possible to convert to RGB data. Further detail will be described using FIG. 5, but since it is image processing for a movie, parameters etc. are accordingly set to values that are suitable for a movie.

Once image processing has been carried out, LCD display is next carried out (S77). Here, one frame of a movie that was acquired in step S73 and subjected to image processing in step S75 is displayed on the LCD 135.

Once LCD display has been carried out, it is next determined whether or not movie storage is in progress, similar to step S31 (S79). In this step it is determined whether or not the storage in progress flag is on. If the result of this determination is that movie storage is in progress, storing of a movie file is then carried out (S81). Image data of a movie that was acquired in step S73 and subjected to image processing in step S75 is subjected to compression in accordance with a movie file format by the image compression and expansion section 117, and stored in the storage medium 131. If movie storage is not in progress, then it is still image shooting mode, and so live view display is carried out in step S77, and step S81 is skipped.

If saving to a movie file in step S81 is carried out, or if the result of determination in step S79 is that movie storage was not in progress, the movie shooting and image processing flow is terminated and the originating flow is returned to.

Figure 5:
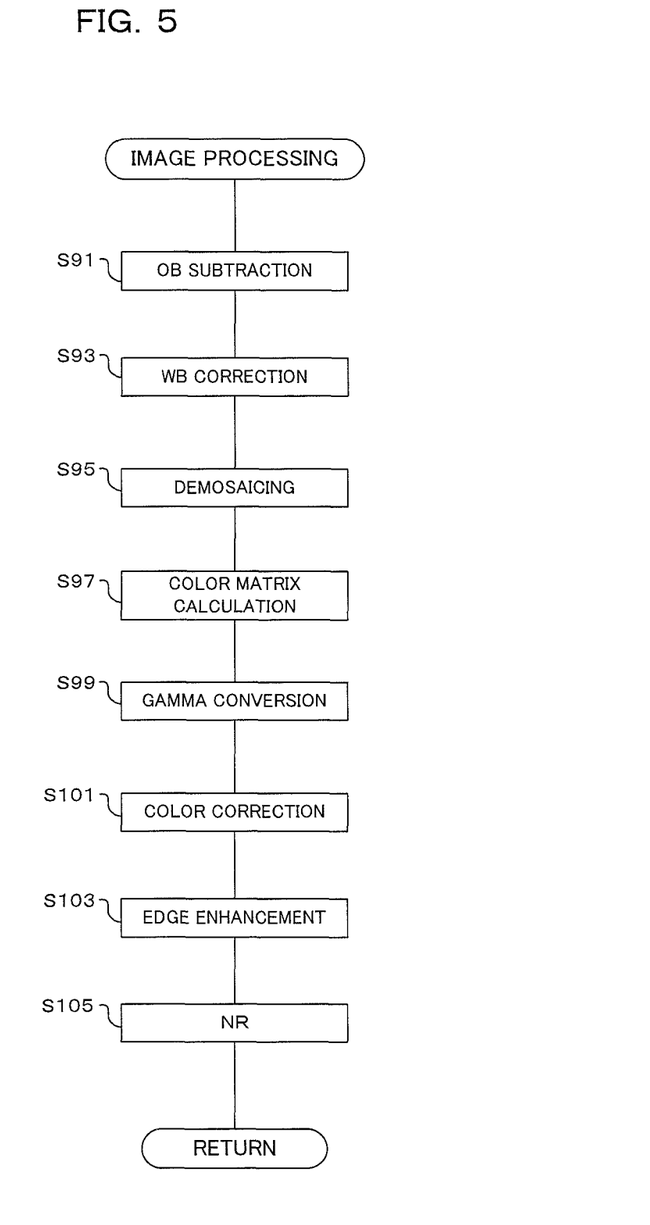
FIG. 5 is a flowchart showing operation of a developing processing of the digital camera of the first embodiment of the present invention.

Next, the image processing of steps S53 and S75 will be described using FIG. 5. If the image processing flow is entered, first optical black (0B) calculation is carried out (S91). In this step, an optical black value, which is ascribable to dark current etc. of the image sensor 103, is respectively subtracted from a pixel value of each pixel constituting the image data.

If OB calculation has been carried out white balance (WB) correction is next carried out (S93). In this step, white balance correction is carried out for the image data by the WB correction section 111b in accordance with the set white balance mode. Specifically, correction is carried out by reading out R gain and B gain corresponding to the white balance mode set by the user from the flash memory 125 of the camera body, and multiplying the image data of the Bayer array by these values. Alternatively, in the case of auto white balance, R gain and B gain are calculated from RAW data, and correction is carried out using these values. WB correction during image processing that is carried out at the time of image combination (refer to S137 of FIG. 6), which will be described later, is carried out using a combined WB gain. Also, WB correction during image processing carried out at the time of RAW editing (refer to S155 of FIG. 7), which will be described later, is carried out using a WB gain stored in a header portion of image data.

Next, demosaicing processing is carried out (S95). In this step, image data that has been subjected to white balance correction is converted to data having each pixel made up of RGB data by the demosaicing processing section 111c. Specifically, data not at a specified pixel position is obtained by interpolation from around that pixel position, and converted to RGB data.

Once demosaicing processing has been carried out, color matrix calculation is carried out (S97). In this step, a linear transformation to multiply the image data by a color matrix coefficient according to the set white balance mode is carried out by the color matrix calculating section 111e, to correct the color of the image data. The color matrix coefficient is stored in the flash memory 125, and so it is read out and used.

Once color matrix calculation has been carried out, a gamma transformation is carried out (S99). In this step, gamma correction processing is carried out for the image data by the gamma and color reproduction processing section 111d. Color correction is then carried out (S101). In this step, chroma and hue correction processing is carried out for the image data by the gamma and color reproduction processing section 111d.

Once this color correction has been carried out, edge enhancement is carried out next (S103). In this step, the edge enhancement processing section 111f enhances edges of the image data, by extracting edge components for image data that has been subjected to gamma correction and color reproduction processing, using a band pass filter, multiplying by a coefficient corresponding to a degree of edge enhancement, and adding to the image data.

If edge enhancement has been carried out, noise reduction processing (NR) is carried out next (S105). In this step, the NR processing section 111g reduces noise of the image data using a filter to reduce a high-frequency component or by coring processing etc. Once noise reduction processing has been carried out, the originating processing flow is returned to.

Next the image combining of step S19 will be described using FIG. 6. If the image combining flow is entered, setting of the white balance (WB) mode is first carried out (S111). Here, the WB mode that was set by the user on the menu screen is selected. As a WB mode there are auto white balance (AWB), clear sky, cloudy, shade, tungsten bulb, fluorescent lighting, and underwater auto etc.

Once WB mode setting has been carried out, RAW file selection is carried out next (S113). Thumbnails for RAW files that are stored in the storage medium 131 are displayed on the LCD 135 as a RAW file table. The user selects an Nth (N≥2) RAW file by operating the cross-shaped button and the OK button.

Once the selection RAW of a file has been carried out, it is next determined whether or not there is automatic setting of composition coefficient (S115). The composition coefficient is information relating to combination ratio, and is a coefficient for setting the degree to which each image appears strongly when combining two or more images. Automatic setting is automatically setting this composition coefficient, and in this embodiment gives each image an equal ratio.

If the result of determination in step S115 is that the composition coefficient is automatically set, the composition coefficient is set to 1/N (S117). In the case of automatic setting, 1/N is set as the coefficient for all of the selected RAW files. Obviously it is possible to use a value other than 1/N, or to automatically set a different coefficient for each image.

On the other hand, if the result of determination in step S115 is that the composition coefficient is not automatically set, the composition coefficient is made a user setting (S119). Here, a screen for coefficient setting is displayed on the LCD 135, and the user sets the coefficient (where $K_i>0$, $1 \le i \le N$, and i is an integer) for each RAW file.

Next, if setting of the composition coefficient is carried out in steps S117 or S119, calculation is carried out while sequentially changing i from 1 to N, in steps S121-S129. RAW read out is first carried out (S123). Here, RAW data for the $i^{th}$ selected RAW file is read out from the storage medium 131.

If the $i^{th}$ RAW data has been read out, WB gain calculation is next carried out for the read-out RAW data (S125). WB gain corresponding to the $i^{th}$ RAW data (RGi:Rgain, BGi:Bgain) is calculated for the set WB mode. In the case where WB gain corresponding to each WB mode is stored in the storage medium 131 together with the RAW file, the WB gain may be acquired from the header of the RAW file.

If calculation of WB gain has been carried out, coefficient multiplication is next carried out (S127). Here, the RAW data is multiplied by the composition coefficient Ki that was set in step S117 or step S119. Specifically, the RAW data is raw data from each pixel, and the value of each pixel is respectively multiplied by the composition coefficient Ki.

Once coefficient multiplication has been carried out, it is next determined whether the variable i has reached the selected RAW file number N (S129). If the result of this determination is that the variable i has not reached N, 1 is added to the variable i, processing returns to step S121, and the previous calculations etc. are repeated.

If the variable i reaches N in step S129, addition is next carried out (S131). Here, pixel data that was subjected to coefficient multiplication in step S127 is added for each identical pixel (Bayer data) of the RAW file.

Once addition has been carried out, combined WB gain is next calculated (S133). Here, a weighted average of WB gain corresponding to each RAW file is calculated. If R gain is made RG and B gain is made BG, the following equations (1) and (2) are obtained.

$$RG = \Sigma(Ki \times RGi)/\Sigma(Ki) \quad (1)$$

$$BG = \Sigma(Ki \times BGi)/\Sigma(Ki) \quad (2)$$

Once combined WB gain has been calculated, OB value calculation is next carried out (S135). Here, OBi representing an OB value for each RAW data is read out, and an OB the value for a combined image is calculated using the following equation (3).

$$OB = \Sigma(Ki \times OBi) \quad (3)$$

If OB value has been calculated, image processing is carried out (S137). Here, image processing is carried out using data that was combined in step S131, WB gain that was calculated from the weighted average in step S133, and OB value that was calculated in step S135. This processing is the same as the flow that was described using FIG. 5, and so detailed description is omitted.

Once image processing has been carried out, it is next determined whether or not there is RAW storage, as in step S57 (S139). If the result of this determination is RAW storage, generation of a RAW file is next carried out (S141). Here, a RAW file is generated using the OB value that was calculated in step S135, or image data that was combined as Bayer data in step S131, or WB gain that was calculated using the same method as the method in which each WB gain was calculated in step S133. Once the RAW file has been generated, this generated RAW file is stored in the storage medium 131 (S143).

If the RAW file is stored in step S143, or if the result of determination in step S139 was not RAW storage, JPEG file generation is next carried out, similarly to step S63 (S145). The generated JPEG file is then stored in the storage medium 131 (S147). Once the JPEG file is stored, the original processing flow is returned to.

In this way, in the image combination flow of this embodiment, if a plurality of RAW files for combination are selected (S113), then for each RAW data WB gain is calculated in accordance with the set WB mode, or alternatively acquired from a header (S125), combination WB gain corresponding to combined RAW data is calculated (S133), and in the image processing (S137) image processing is carried out using the combined WB gain (S93). It is therefore possible, when carrying out image combination, to carry out appropriate WB correction according to the WB mode.

Figure 7:
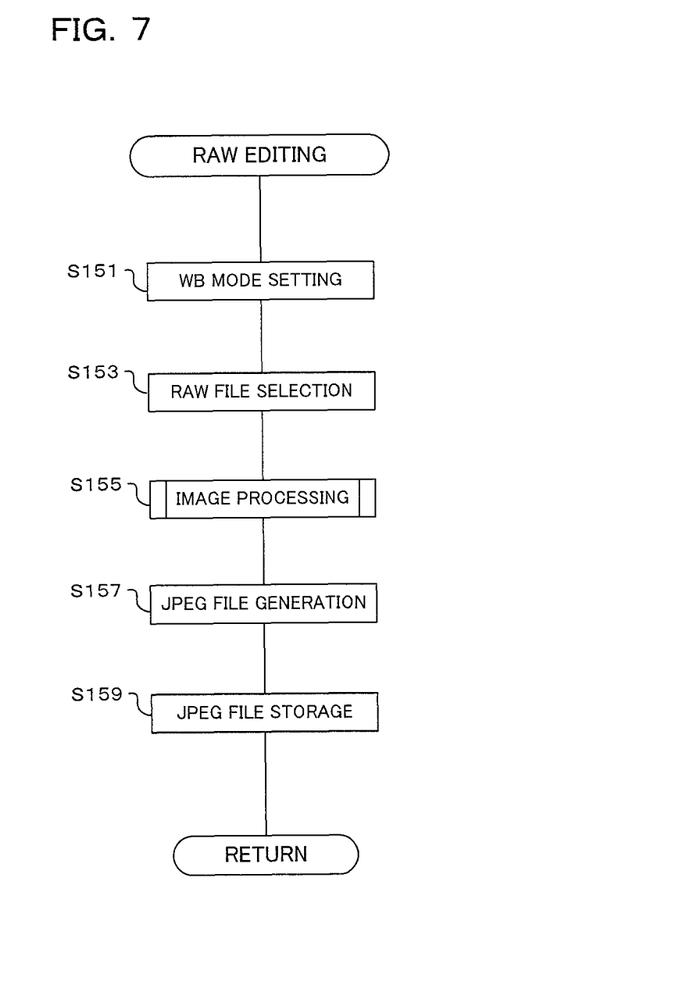
FIG. 7 is a flowchart showing a RAW editing operation of digital camera of the first embodiment of the present invention.

Next, the RAW editing of step S23 will be described using FIG. 7. If the RAW editing flow is entered, first, similarly to step S111, WB mode setting is carried out (S151). Next, RAW file selection is carried out (S153). Here, thumbnails for RAW files that are stored in the storage medium 131 are displayed as a RAW file table. The user selects one RAW file by operating the cross-shaped button and the OK button.

If a RAW file is selected, image processing of the selected RAW file is next carried out (S155). Here, information stored in the selected RAW file is read out, and processed in accordance with the image processing flow shown in FIG. 5. Once image processing has been carried out, a JPEG file is generated (S157), similarly to step S63. The generated JPEG file is then stored in the storage medium 131 (S159). Once the JPEG file is stored, the originating processing flow is returned to.

In this way, in the first embodiment of the present invention, RAW files are selected (S113), and each RAW data is multiplied by a combination coefficient (127) and combined by adding (S131). WB gain for a combined image is obtained using a weighted average of coefficient on WB gain that was calculated for each RAW data (S133). It is therefore possible to perform change, that is the same as change in color cast for JPEG image arising when RAW editing has been carried out to change WB mode in RAW data before combination, on a combined RAW image.

Figure 8:
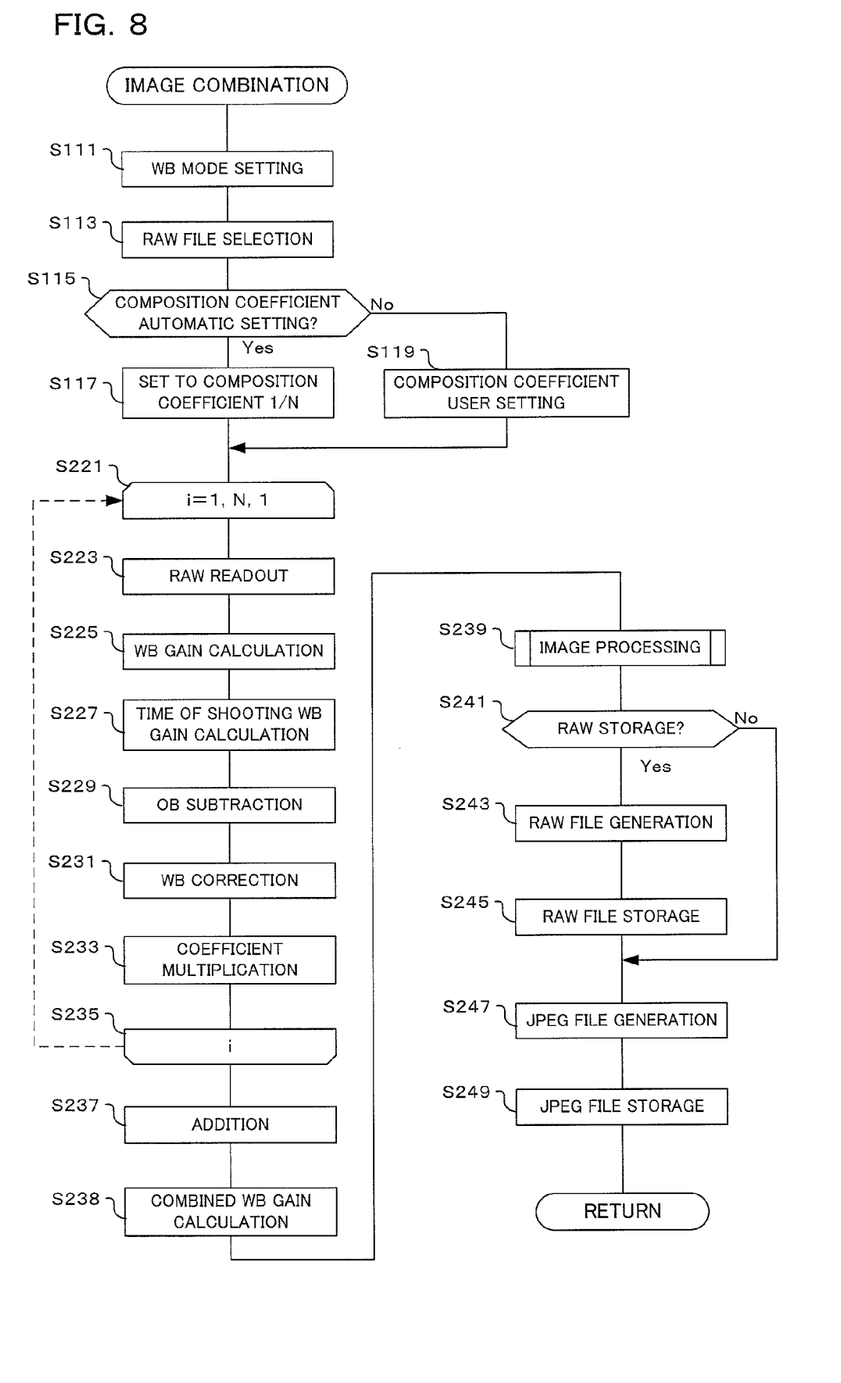
FIG. 8 is a flowchart showing an image combination operation of a digital camera of a second embodiment of the present invention.

Next, a second embodiment of the present invention will be described using FIG. 8. With the first embodiment, WB gain correction and OB subtraction were not carried out for each RAW data, but in the second embodiment OB subtraction and WB correction are carried out for each RAW data. The structure of the second embodiment is substantially the same as the structure shown in FIG. 1, and the only change in the flowcharts is that the flow for image combination shown in FIG. 6 is changed to the flow for image combination shown in FIG. 8, and so description will focus on points of difference.

Figure 6:
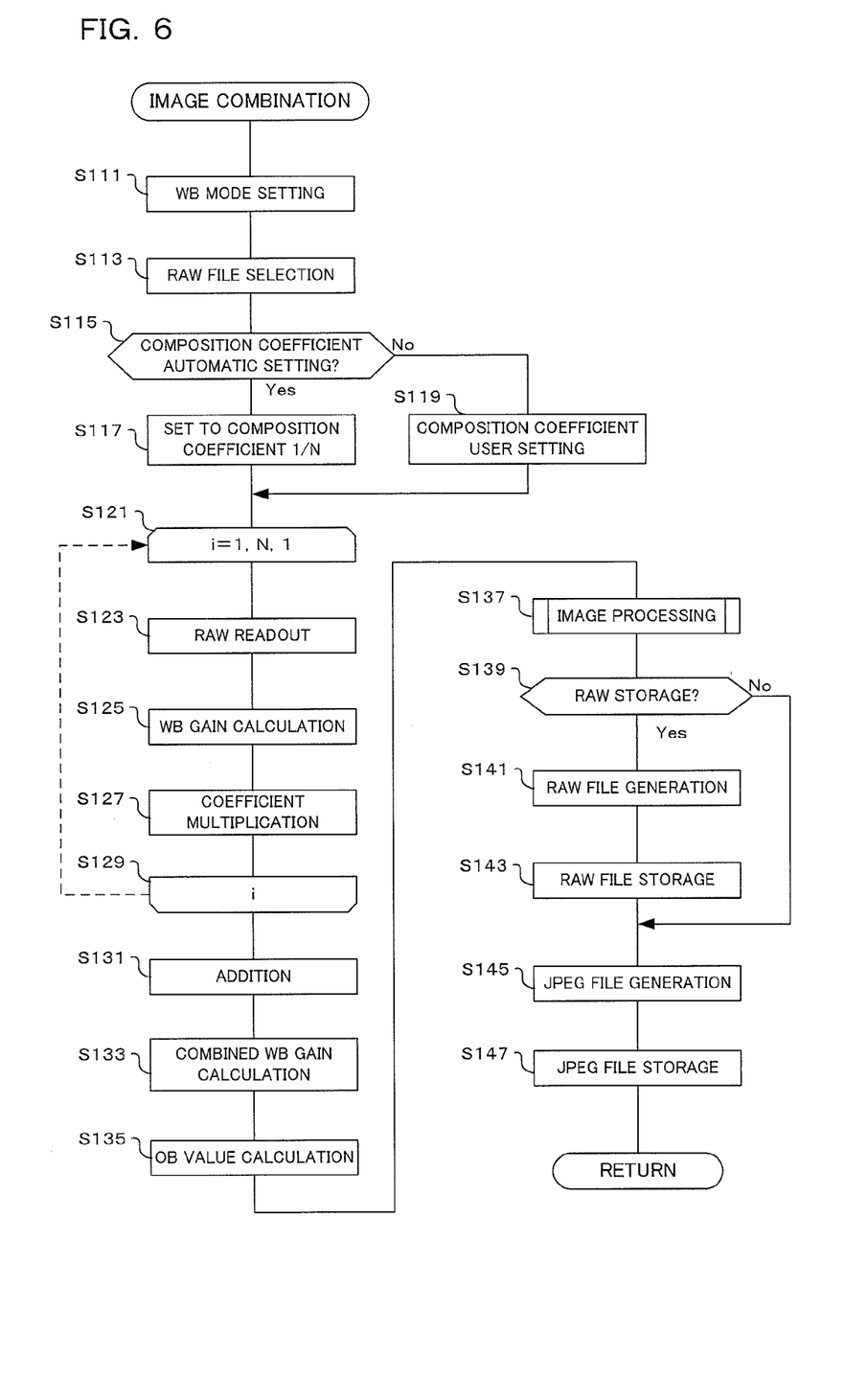
FIG. 6 is a flowchart showing an image combination operation of the digital camera of the first embodiment of the present invention.

If the flow for image combination of this embodiment is entered, from step S111 to step S119 is the same as the flow shown in FIG. 6 of the first embodiment, and so detailed description will be omitted.

Next, if setting of the composition coefficient is carried out in steps S117 or S119, calculation is carried out while sequentially changing i from 1 to N, in steps S221-S235. RAW data is first read out (S223). Here, the RAW data for the $i^{th}$ selected RAW file is read out from the storage medium 131.

If data of a RAW file has been read out, WB gain calculation is next carried out (S225). Here, WB gain corresponding to the $i^{th}$ RAW data (RGi:Rgain, BGi:Bgain) and WB gain corresponding to clear sky (RGi', BGi') are calculated for the set WB mode. In the case where WB gain corresponding to each WB mode is stored in the storage medium 131 together with the RAW file, the WB gain may be acquired from the header of the RAW file. In this embodiment, WB gain for clear sky is calculated, but is not limited to clear sky and it is also possible to use WB gain for another WB mode.

Once WB gain has been calculated, calculation of WB gain at the time of shooting is carried out (S227). WB gain corresponding to the $i^{th}$ RAW file is calculated in accordance with the WB mode setting at the time of shooting. By storing WB gain corresponding to each WB mode together with the RAW file, the WB gain may be acquired from the header of the RAW file. Obviously it is also possible to use AWB, for example, and not the WB mode at the time of shooting.

Once the WB gain at the time of shooting has been calculated, OB subtraction is carried out (S229). Here, an OB value for Bayer data of the $i^{th}$ RAW file is acquired from the RAW file, and OB subtraction is carried out.

Once OB subtraction has been carried out, WB correction is carried out (S231). Here, WB correction is carried out by multiplying Bayer data that has been subjected to OB subtraction by WB gain at the time of shooting that was calculated in step S227.

Once WB correction has been carried out, coefficient multiplication is carried out (S233). Here, Bayer data that has been subjected to WB correction is multiplied by a composition coefficient Ki that was set in step S117 or S119.

Once coefficient multiplication has been carried out, it is next determined whether the variable i has reached the selected RAW file number N (S235). If the result of this determination is that the variable i has not reached N, 1 is added to the variable i, processing returns to step S221, and the previous calculations etc. are repeated.

If the variable i reaches N in step S235, addition is next carried out (S237). Here, pixel data that was subjected to OB subtraction, WB correction and coefficient multiplication is added for each identical pixel (Bayer data) of the RAW file.

Once addition has been carried out, combined WB gain is next calculated (S238). Here, a weighted average of WB gain corresponding to each RAW file is calculated based on the following equations (4) and (5). Here, a "converted combination image WB gain" acquired by dividing a value for WB gain, corresponding to each RAW data according to the current WB setting mode that has been subjected to a weighted average using the composition coefficient, by a value for WB gain corresponding to each RAW data according to a specified WB setting mode (clear sky here) that has been subjected to a weighted average using the composition coefficient, is calculated.

$$RG=\{\Sigma(Ki \times RGi)/\Sigma(Ki)\}/\{\Sigma(Ki \times RGi')/\Sigma(Ki)\} \quad (4)$$

$$BG=\{\Sigma(Ki \times BGi)/\Sigma(Ki)\}/\{\Sigma(Ki \times BGi')/\Sigma(Ki)\} \quad (5)$$

Once combined WB gain has been calculated, image processing is next calculated (S239). Image processing is carried out based on the image processing flow that was described using FIG. 5. This image processing is carried out using data that was combined by addition in step S237, and combined WB gain that was calculated in step S238. Since the OB value has already been combined by subtraction (refer to S229), this processing is carried out here with OB value set to 0.

Once image processing has been carried out, it is next determined whether or not there is RAW storage, as in step S139 (S241). If the result of this determination is RAW storage, generation of a RAW file is carried out (S243). Here, OB value is stored in the RAW file as 0 since the OB value has already been combined (S237) by subtraction (S229). Other than this, the RAW file is generated in the same way as in step S141. Once the RAW file has been generated, storage of the RAW file is carried out (S245), similarly to step S143.

If the RAW file storage has been carried out, or if the result of determination in step S241 was not RAW storage, JPEG file generation is next carried out (S247), similarly to step S145. Next, similarly to step S147, storage of the JPEG file is carried out (S249). Once storage of the JPEG file is carried out, the original processing flow is returned to.

As has been described above, with the second embodiment, at the time of combination, RAW data that has been multiplied by WB gain at the time of shooting is combined (S231). As a result, with the example of this embodiment, WB gain for a combined image uses values resulting from respectively dividing WB gain that has been calculated for each RAW data and subjected to weighted average for a coefficient, by gain for clear sky mode that has been similarly calculated. This calculation is obviously not limited to clear sky mode, and another WB mode may be used, or a fixed value may always be used.

Image combination is combination of taken images of different scenes, and what type of light source the shooting was carried out under it is not clear. However, since individual taken images are RAW data that have been subjected to WB correction according to setting at the time of shooting, and these RAW data are combined, white balance of the combined image is made appropriate. In this embodiment, therefore, a combined image is taken as image data subjected to WB correction in natural light, namely, in a general clear sky mode, and uses gain that has been divided by WB gain corresponding to clear sky mode. As a result, it is possible to appropriately change color cast according to the WB mode setting.

As has been described above, with each of the embodiments of the present invention the WB correction section 111b carries out white balance correction for combined image data (S93) using combined image WB gain (S133, S238) according to setting of WB by the operating section 123. It is therefore possible, when carrying out image combination, to carry out appropriate WB correction according to the WB mode.

Also, with each of the embodiments of the present invention, combined image WB gain or converted combined image WB gain for combined image data that has been calculated for at least one or more of the WB modes capable of being set by the WB setting section, and the combined image data, are held in the same file. Specifically, gain for each WB mode is calculated for the combined image, and stored in a RAW image format together with combined image data. It is therefore possible to carry out image processing with identical processing without differentiating between a combined image and a RAW image.

Each of the embodiments of the present invention have been described for an example using Bayer data as RAW data. However, this RAW data is not limited to Bayer data, and can also be data acquired from an image sensor having a Foveon array.

Also, with each of the embodiments of the present invention, flow for combining by selecting RAW files for image combination is shown. However, this is not limiting, and if an image combination mode is provided in the camera, and the image combination mode is selected, it is possible to carry out the same processing using a plurality of Bayer data acquired by shooting. The invention is also not limited to already taken images, and it is possible to select a plurality of images during live view display, and to perform image combination and display before shooting using the selected images.

Also, with each of the embodiments of the present invention, description has been given using a using a digital camera as an apparatus for taking pictures, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc.

Also, each of the embodiments of the present invention has been described for an example applied to a camera as an image processing device, but it is also possible to apply to an image processing device other than a camera. For example, it is possible to apply the present invention to a personal computer having taken images stored in a storage medium.

Also, regarding the operation flow in the patent claims, the specification and the drawings, for the sake of convenience description has been given using words representing sequence, such as "first" and "next", but this does not mean that implementation must be in this order.

The present invention is not limited to the above-described embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An image processing device comprising:
an image combining section for combining a plurality of combination image data of different scenes and generating combined image data;
a WB setting section for performing setting for white balance correction processing;
an image WB gain calculation section for calculating image WB gain respectively for the plurality of combination image data in accordance with setting of the WB setting section;
a combined image WB gain calculating section for calculating combined image WB gain for the combined image data in accordance with information relating to a combination ratio for the image combining section and image WB gain for the respective plurality of combination image data calculated by the image WB gain calculation section; and
a WB correction section for carrying out white balance correction for image data according to the combined image WB gain, wherein the WB correction section carries out white balance correction for the combined image data using combined image WB gain that has been calculated by the combined image WB gain calculating section, in accordance with setting of the WB setting section,
wherein the image combining section includes a composition coefficient setting section for setting a composition coefficient at the time of combination for the plurality of combination image data,
wherein the image combining section combines the plurality of combination image data in accordance with the composition coefficient and generates combined image data, and
wherein the combined image WB gain calculating section calculates combined image WB gain for the combined image data, by subjecting image WB gain for the respective plurality of combined image data calculated by the image WB gain calculating section to weighted addition in accordance with the composition coefficient.

2. An image processing device, comprising:
an image combining section for combining a plurality of combination image data of different scenes and generating combined image data;
a WB setting section for performing setting for white balance correction processing;
an image WB gain in calculation section for calculating image WB gain respectively for the plurality of combination image data in accordance with setting of the WB setting section;
a combined image WB gain calculating section for calculating combined image WB gain for the combined image data in accordance with information relating to a combination ratio for the image combining section and image WB gain for the respective plurality of combination image data; and
a WB correction section for carrying out white balance correction for image data according to the combined image WB gain, wherein the WB correction section carries out white balance correction for the combined image data using combined image WB gain that has been calculated by the combined image WB gain calculating section, in accordance with setting of the WB setting section,
wherein the image combining section includes a composition coefficient setting section for setting a composition coefficient at the time of combination for the plurality of combination image data, and a multiplication section for multiplying the image data by a specified value, and an adding section for adding a plurality of image data,
wherein the multiplying section generates a plurality of intermediate image data by multiplying the plurality of combination image data by the composition coefficient, and the adding section generates the combined image data by adding the plurality of intermediate image data, and
wherein the combined image WB gain calculating section calculates combined image WB gain for the combined image data, in accordance with the composition coefficient, by calculating a weighted average of image WB gain for the respective plurality of image data calculated by the image WB gain calculating section.

3. The image processing device of claim 1 wherein,
for the respective plurality of image data, the WB correction section inputs a plurality of image data that have been subjected to at least white balance correction processing to the image combining section as the plurality of combination image data, and
the WB correction section carries out white balance correction for the combined image data using converted combined image WB gain that results from reducing the combined image WB gain calculated by combined image WB gain calculating section, in accordance with setting of the WB setting section, by a specified value.

4. The image processing device of claim 3 wherein,
the WB setting section includes at least a WB mode for clear sky, and
the specified value is combined image WB gain calculated by the combined image WB gain calculating section with respect to WB mode for the clear sky.

5. The image processing device of claim 3 further comprising,
an image data storage section for saving converted combined image WB gain for the combined image data that has been calculated for at least one or more of the WB modes capable of being set by the WB setting section, and the combined image data, in the same file.

6. The image processing device of claim 1 further comprising,
an image data storage section for saving combined image WB gain for the combined image data that has been calculated for at least one or more of the WB modes capable of being set by the WB setting section, and the combined image data, in the same file.

7. A white balance correction method for a combined image formed by combining a plurality of image data of different scenes output from an imaging section, or output from a storage section, comprising:
generating combined image data by combining a plurality of image data of different scenes acquired by imaging of the imaging section, or stored in the storage section;
calculating image WB gain for the respective plurality of combination image data according to setting for white balance correction processing;

calculating combined image WB gain corresponding to the combined image data in accordance with information relating to combination ratio for the plurality of image data and image WB gain respectively corresponding to the plurality of image data; and carrying out white balance correction for the combined image data according to the combined image WB gain, wherein the combined image data is generated by setting a composition coefficient at the time of combination for the plurality of combination images, and combining the plurality of combination image data in accordance with the composition coefficient, and wherein the combined image WB gain is calculated by subjecting image WB gain for the respective plurality of combination image data to weighted addition in accordance with the composition coefficient.

8. A white balance correction method for a combined image formed by combining a plurality of image data output from an imaging section, or output from a storage section, comprising:

generating combined image data by combining a plurality of image data acquired by imaging of the imaging section, or stored in the storage section;

calculating image WB gain for the respective plurality of combination image data according to setting for white balance correction processing;

calculating combined image WB gain corresponding to the combined image data in accordance with information relating to combination ratio for the plurality of image data and image WB gain respectively corresponding to the plurality of image data; and carrying out white balance correction for the combined image data according to the combined image WB gain, wherein the combined image data is generated by generating a plurality of intermediate image data by multiplying the plurality of combination image data by the composition coefficient, and adding the plurality of intermediate image data, and wherein the combined image WB gain is calculated by calculating a weighted average of image WB gain for the respective plurality of image data in accordance with the composition coefficient.

9. The white balance correction method of claim 7, wherein for the respective plurality of image data, a plurality of image data that have been subjected to at least white balance correction processing are made the plurality of combination image data, and white balance correction is carried out for the combined image data using converted combined image WB gain that results from reducing the combined image WB gain by a specified value, in accordance with setting of the WB setting section.

10. The white balance correction method of claim 9, wherein at least a WB mode for clear sky is included as setting for the white balance correction processing, and the specified value is combined image WB gain calculated with respect to WB mode for the clear sky.

11. An imaging device comprising:

an imaging section for forming a subject image of different scenes and generating image data;

an image creation and storage section for subjecting image data output from the imaging section to image processing to create image data, and storing the image data;

an image combining section for combining a plurality of combination image data and generating combined image data;

a WB setting section for performing setting for white balance correction processing;

an image WB gain calculation section for calculating image WB gain respectively for the plurality of combination image data in accordance with setting of the WB setting section;

a combined image WB gain calculating section for calculating combined image WB gain for the combined image data in accordance with information relating to a combination ratio for the image combining section and image WB gain for the respective plurality of combination image data; and a WB correction section for carrying out white balance correction for image data according to the combined image WB gain, wherein the WB correction section carries out white balance correction for the combined image data using combined image WB gain that has been calculated by the combined image WB gain calculating section, in accordance with setting of the WB setting section, wherein the image combining section includes a composition coefficient setting section for setting a composition coefficient at the time of combination for the plurality of combination image date, wherein the image combining section combines the plurality of combination image data in accordance with the composition coefficient and generates combined image data, and wherein the combined image WB gain calculating section calculates combined image WB gain for the combined image data in accordance with the composition coefficient and image WB gain for the respective plurality of combination image data calculated by the image WB gain calculation section.

12. An imaging device comprising:

an imaging section for forming a subject image of different scenes and generating image data;

an image creation and storage section for subjecting image data output from the imaging section to image processing to create image data, and storing the image data;

an image combining section for combining a plurality of combination image data and generating combined image data;

a WB setting section for performing setting for white balance correction processing;

an image WB gain calculation section for calculating image WB gain respectively for the plurality of combination image data in accordance with setting of the WB setting section;

a combined image WB gain calculating section for calculating combined image WB gain for the combined image data in accordance with information relating to a combination ratio for the image combining section and image WB gain for the respective plurality of combination image data; and a WB correction section for carrying out white balance correction for image data according to the combined image WB gain, wherein the WB correction section carries out white balance correction for the combined image data using combined image WB gain that has been calculated by the combined image WB gain calculating section, in accordance with setting of the WB setting section, wherein the image combining section includes a composition coefficient setting section for setting a composition coefficient at the time of combination for the plurality of combination image data, and a multiplication section for multiplying image data by a specified value, and an adding section for adding a plurality of image data, wherein the multiplying section generates a plurality of intermediate image data by multiplying the plurality of combination image data by the composition coefficient, and the adding section generates the combined image data by adding the plurality of intermediate image data, and wherein the combined image WB gain calculating section calculates combined image WB gain for the combined image data, in accordance with the composition coefficient, by calculating a weighted average of image WB gain for the respective plurality of image data calculated by the image WB gain calculating section.

13. The imaging device of claim 11, wherein
for the respective plurality of image data, the WB correction section inputs a plurality of image data that have been subjected to at least white balance correction processing to the image combining section as the plurality of combination image data, and
the WB correction section carries out white balance correction for the combined image data using converted combined image WB gain that results from reducing the combined image WB gain calculated by combined image WB gain calculating section, in accordance with setting of the WB setting section, by a specified value.

14. The imaging device of claim 13, wherein
the WB setting section includes at least a WB mode for clear sky, and
the specified value is combined image WB gain calculated by the combined image WB gain calculating section with respect to WB mode for the clear sky.

15. The imaging device of claim 13, further comprising;
an image data storage section for saving converted combined image WB gain for the combined image data that has been calculated for at least one or more of the WB modes capable of being set by the WB setting section, and the combined image data, in the same file.

16. The imaging device of claim 11, further comprising:
an image data storage section for saving combined image WB gain for the combined image data that has been calculated for at least one or more of the WB modes capable of being set by the WB setting section, and the combined image data, in the same file.

17. The imaging device of claim 11, wherein
the plurality of combination image data and the combined image data are RAW data.

18. The image processing device of claim 1 wherein the image data of different scenes have different color temperatures due to different lighting environments.

19. The white balance correction method of claim 7, wherein the image data of different scenes have different color temperatures due to different lighting environments.

20. The imaging device of claim 11, wherein the image data of different scenes have different color temperatures due to different lighting environments.

* * * * *